(12) United States Patent
Kato

(10) Patent No.: US 7,535,655 B2
(45) Date of Patent: May 19, 2009

(54) LENS DEVICE

(75) Inventor: Hiroshi Kato, Saitama (JP)

(73) Assignee: Fujinon Corporation, Saitama-Shi (JP)

(*) Notice: Subject to any disclaimer, the term of this patent is extended or adjusted under 35 U.S.C. 154(b) by 0 days.

(21) Appl. No.: 11/717,673

(22) Filed: Mar. 14, 2007

(65) Prior Publication Data
US 2007/0217029 A1 Sep. 20, 2007

(30) Foreign Application Priority Data
Mar. 15, 2006 (JP) .............................. 2006-071533

(51) Int. Cl.
G02B 15/14 (2006.01)
G02B 7/02 (2006.01)
(52) U.S. Cl. .................... 359/694; 359/701; 359/823
(58) Field of Classification Search ......... 359/694–703, 359/819–823
See application file for complete search history.

(56) References Cited

U.S. PATENT DOCUMENTS

| 5,416,549 | A |   | 5/1995  | Katsuyama et al. |
|-----------|---|---|---------|------------------|
| 5,687,029 | A | * | 11/1997 | Omi et al. .................... 359/700 |
| 5,826,117 | A |   | 10/1998 | Kawamura et al. |
| 5,995,300 | A | * | 11/1999 | Nishimura et al. .......... 359/699 |
| 7,119,967 | B2 | * | 10/2006 | Kiga et al. .................. 359/694 |

FOREIGN PATENT DOCUMENTS

| JP | 6-313828 A | 11/1994 |
| JP | 3443919 B2 | 6/2003 |
| WO | WO-99/10773 A1 | 3/1999 |

* cited by examiner

*Primary Examiner*—Mohammed Hasan
(74) *Attorney, Agent, or Firm*—Birch, Stewart, Kolasch & Birch, LLP

(57) ABSTRACT

The present invention provides a lens device provided on a lens barrel for a television camera, the lens device comprising: a master lens; a flange-back adjusting mechanism for moving the master lens forward/backward in an optical axis direction; a flange-back adjusting unit including the master lens and the flange-back adjusting mechanism, the flange-back adjusting unit being movable forward/backward in the optical axis direction; and a fixing member for fixing the flange-back adjusting unit on a predetermined position after the forward/backward movement.

17 Claims, 7 Drawing Sheets

LENS DEVICE

BACKGROUND OF THE INVENTION

1. Field of the Invention

The present invention relates to a lens device of a television camera, and particularly relates to a lens device of a television camera including a flange-back adjusting mechanism for moving a master lens forward and backward in an optical axis direction.

2. Description of the Related Art

Conventionally, among lens barrels for television cameras for commercial use, broadcast stations, and so on, lens barrels including both of a hanging mount (also referred to as a hanger mount) for mounting a large camera and a bayonet mount for mounting a portable camera have been known.

When a television camera cannot be mounted on a hanging mount or a bayonet mount (for example, a camera manufactured by a different manufacturer from that of a lens barrel), the television camera can be combined for use with the lens barrel by using a lens supporter for mounting a television camera (also referred to as a built-up unit), the lens supporter being mounted on the hanging mount (Japanese Patent No. 3443919). FIG. 1 shows an example in which a television camera K is mounted on a lens supporter S mounted on a hanging mount 11.

When the lens supporter S is mounted on a lens barrel 10, a flange surface 12a of a bayonet mount 12 may interfere with the television camera K, depending upon the position of the television camera K mounted on the lens supporter S. Thus in order to prevent the interference, as shown in FIG. 1, the television camera K is mounted on the lens supporter S slightly away from the flange surface 12a of the bayonet mount 12. When the television camera K is mounted thus slightly away from the flange surface 12a of the bayonet mount 12, the imaging surface of the television camera K and an image-forming position are "displaced" from each other. The "displacement" can be corrected to some extent by a flange-back adjusting mechanism provided in the lens barrel and so on.

SUMMARY OF THE INVENTION

However, generally flange-back adjusting mechanisms provided in lens barrels and so on are not designed to correct a "displacement" caused by mounting a television camera slightly away from the flange surface of a bayonet mount. Thus a "displacement" may not be perfectly corrected.

The present invention is designed in view of these circumstances. An object of the present invention is to provide a lens device capable of correcting a "displacement" caused by mounting a television camera slightly away from a reference surface (for example, the flange surface of a bayonet mount).

The present invention is designed to solve the problem. According to the invention of a first aspect, a lens device provided on a lens barrel for a television camera includes: a master lens, a flange-back adjusting mechanism for moving the master lens forward/backward in an optical axis direction, a flange-back adjusting unit including the master lens and the flange-back adjusting mechanism, the flange-back adjusting unit being movable forward/backward in the optical axis direction, and a fixing member for fixing the flange-back adjusting unit on a predetermined position after the forward/backward movement.

According to the invention of the first aspect, even when a satisfactory flange-back adjustment cannot be made only by the flange-back adjusting mechanism, a proper flange-back adjustment can be made all the time by moving the flange-back adjusting unit (including the master lens) forward/backward and fixing the flange-back adjusting unit on the predetermined position.

According to the invention of a second aspect, in the invention of the first aspect, the flange-back adjusting mechanism includes: a cylindrical cam having an inner surface on which a cam groove is formed, the cylindrical cam being rotated by driving force transmitted from a driving mechanism, a support ring rotatably supporting the cylindrical cam, and a lens frame having an engaging portion engaged with the cam groove, the lens frame holding the master lens being moved forward/backward in the optical axis direction by relatively moving the engaging portion along the cam groove by the rotation of the cylindrical cam.

According to the invention of the second aspect, in the invention of the first aspect, even when a satisfactory flange-back adjustment cannot be made only by moving the lens frame (that is, the master lens) forward/backward in the optical axis direction by the rotation of the cylindrical cam, a proper flange-back adjustment can be made all the time by moving the flange-back adjusting unit (including the master lens) forward/backward and fixing the flange-back adjusting unit on the predetermined position.

According to the invention of a third aspect, in the invention of the second aspect, the support ring is screwed into an end of the lens barrel, and the flange-back adjusting unit is moved forward/backward in the optical axis direction by adjusting an amount of screwing of the support ring relative to the lens barrel.

According to the invention of the third aspect, the flange-back adjusting unit can be moved forward/backward by adjusting an amount of screwing of the support ring relative to the lens barrel.

According to the invention of a fourth aspect, in the invention of the third aspect, the fixing member is a pressing ring for fixture, the pressing ring being screwed onto the support ring.

According to the invention of the fourth aspect, the flange-back adjusting unit can be fixed on the predetermined position after the forward/backward movement by tightly fitting the pressing ring for fixture.

The invention of a fifth aspect, in the invention of any one of the first to fourth aspects, includes a mounting portion on which a lens supporter for mounting a television camera is mounted, and a display member for displaying a desired position of the flange-back adjusting unit for each camera mounted on the lens supporter for mounting a television camera.

According to the invention of the fifth aspect, display for indicating a desired position of the flange-back adjusting unit for each television camera can be set as a target. Thus the flange-back adjusting unit can be easily moved forward/backward to the target.

According to the invention of a sixth aspect, a lens device provided on a lens barrel for a television camera includes: a master lens, an outer lens frame, an inner lens frame for holding the master lens, the inner lens frame being movable forward/backward on the outer lens frame, a flange-back adjusting mechanism for moving the outer lens frame forward/backward in the optical axis direction, and a fixing member for fixing the inner lens frame on a predetermined position after the forward/backward movement.

According to the invention of the sixth aspect, even when a satisfactory flange-back adjustment cannot be made only by the flange-back adjusting mechanism, a proper flange-back adjustment can be made all the time by moving the inner lens frame forward/backward and fixing the inner lens frame on the predetermined position.

According to the invention of a seventh aspect, in the invention of the sixth aspect, the inner lens frame is screwed into the outer lens frame, and the inner lens frame is moved forward/backward in the optical axis direction by adjusting an amount of screwing of the inner lens frame relative to the outer lens frame.

According to the invention of the seventh aspect, the inner lens frame can be moved forward/backward by adjusting an amount of screwing of the inner lens frame relative to the outer lens frame.

According to the invention of an eighth aspect, in the invention of the seventh aspect, the fixing member is a pressing ring for fixture, the pressing ring being screwed onto the inner lens frame.

According to the invention of the eighth aspect, the inner lens ring can be fixed on the predetermined position after the forward/backward movement by tightly fitting the pressing ring for fixture.

The invention of a ninth aspect, in the invention of any one of the sixth to eighth aspects, includes a mounting portion on which a lens supporter for mounting a television camera is mounted, and a display member for displaying a desired position of the inner lens frame for each camera mounted on the lens supporter for mounting a television camera.

According to the invention of the ninth aspect, display for indicating a desired position of the inner lens frame for each television camera can be set as a target. Thus the inner lens frame can be easily moved forward/backward to the target.

According to the invention of a tenth aspect, a lens device provided on a lens barrel for a television camera includes: a cylindrical cam having an inner surface on which a cam groove is formed, the cylindrical cam being rotated by driving force transmitted from a driving mechanism, a master lens having an engaging portion engaged with the cam groove, the master lens being moved forward/backward in an optical axis direction by relatively moving the engaging portion along the cam groove by the rotation of the cylindrical cam, and a position adjusting mechanism for moving the cylindrical cam forward/backward and fixing the cylindrical cam on a predetermined position after the forward/backward movement.

According to the invention of the tenth aspect, even when a satisfactory flange-back adjustment cannot be made only by moving the master lens forward/backward by the rotation of the cylindrical cam, a proper flange-back adjustment can be made all the time by moving the cylindrical cam forward/backward and fixing the cylindrical cam on the predetermined position.

According to the invention of an eleventh aspect, in the invention of the tenth aspect, the positioning mechanism includes an elastic member and a positioning ring screwed onto the lens barrel, the cylindrical cam is disposed between the elastic member and the positioning ring, the elastic member has one end fixed on the lens barrel and the other end making contact with a side of the cylindrical cam, the positioning ring has one side making contact with the opposite side of the cylindrical cam from the side making contact with the elastic member, and when the positioning ring is rotated to change the screwing position, the cylindrical cam is moved forward/backward to cause the elastic member to extend or contract and the position of the cylindrical cam is fixed after the forward/backward movement.

According to the invention of the eleventh aspect, by rotating the positioning ring, the cylindrical cam can be moved forward/backward and fixed on the predetermined position after the forward/backward movement.

According to the invention of a twelfth aspect, in the invention of the tenth aspect, the positioning mechanism includes an operating member for moving the cylindrical cam forward/backward from the outside of the lens barrel.

According to the invention of the twelfth aspect, the cylindrical cam can be moved forward/backward from the outside of the lens barrel.

The invention of a thirteenth aspect, in the invention of any one of the tenth to twelfth aspects, includes a mounting portion on which a lens supporter for mounting a television camera is mounted, and a display member for displaying a desired position of the cylindrical cam for each camera mounted on the lens supporter for mounting a television camera.

According to the invention of the thirteenth aspect, display indicating a desired position of the cylindrical cam for each television camera can be set as a target. Thus the cylindrical cam can be easily moved forward/backward to the target.

According to the present invention, it is possible to provide a lens device capable of correcting a "displacement" caused by mounting a television camera slightly away from a reference surface (for example, the flange surface of a bayonet mount).

DETAILED DESCRIPTION OF THE PREFERRED EMBODIMENTS

A lens barrel according to the first embodiment of a lens device of the present invention will now be described below in accordance with the accompanying drawings.

Figure 1:
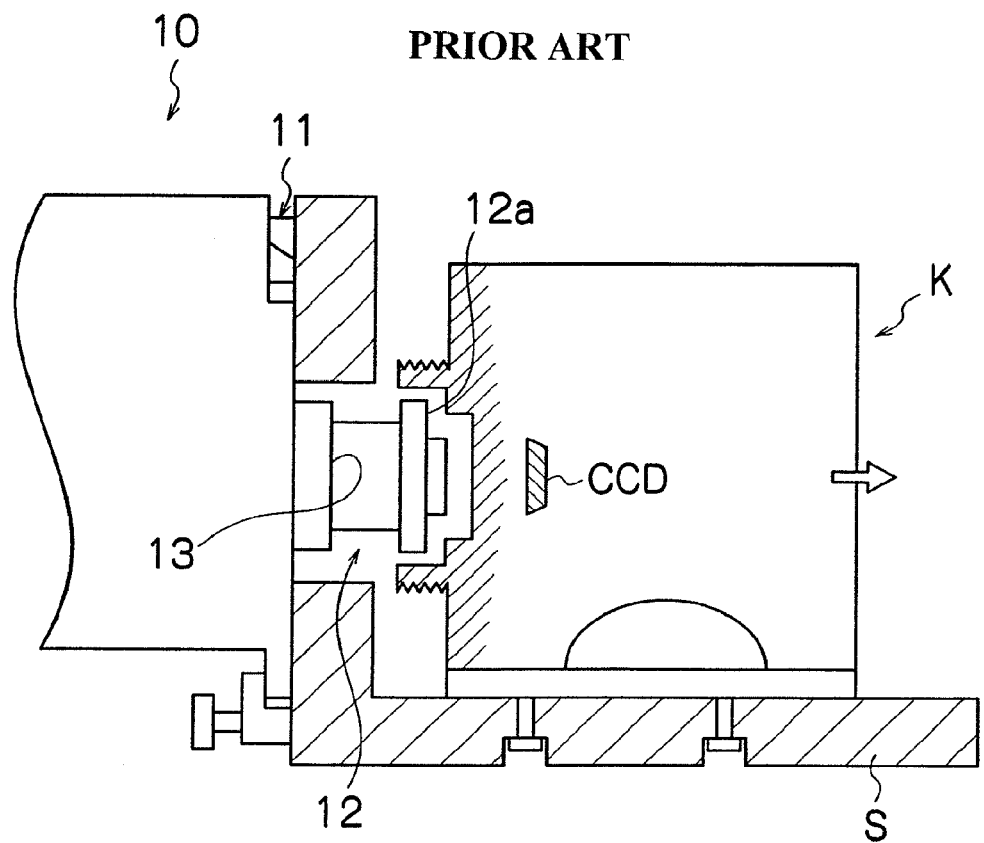
FIG. 1 is a side view for explaining the connection relationship between a lens barrel and a lens supporter S according to the first embodiment of a lens device of the present invention.
Figure 2:
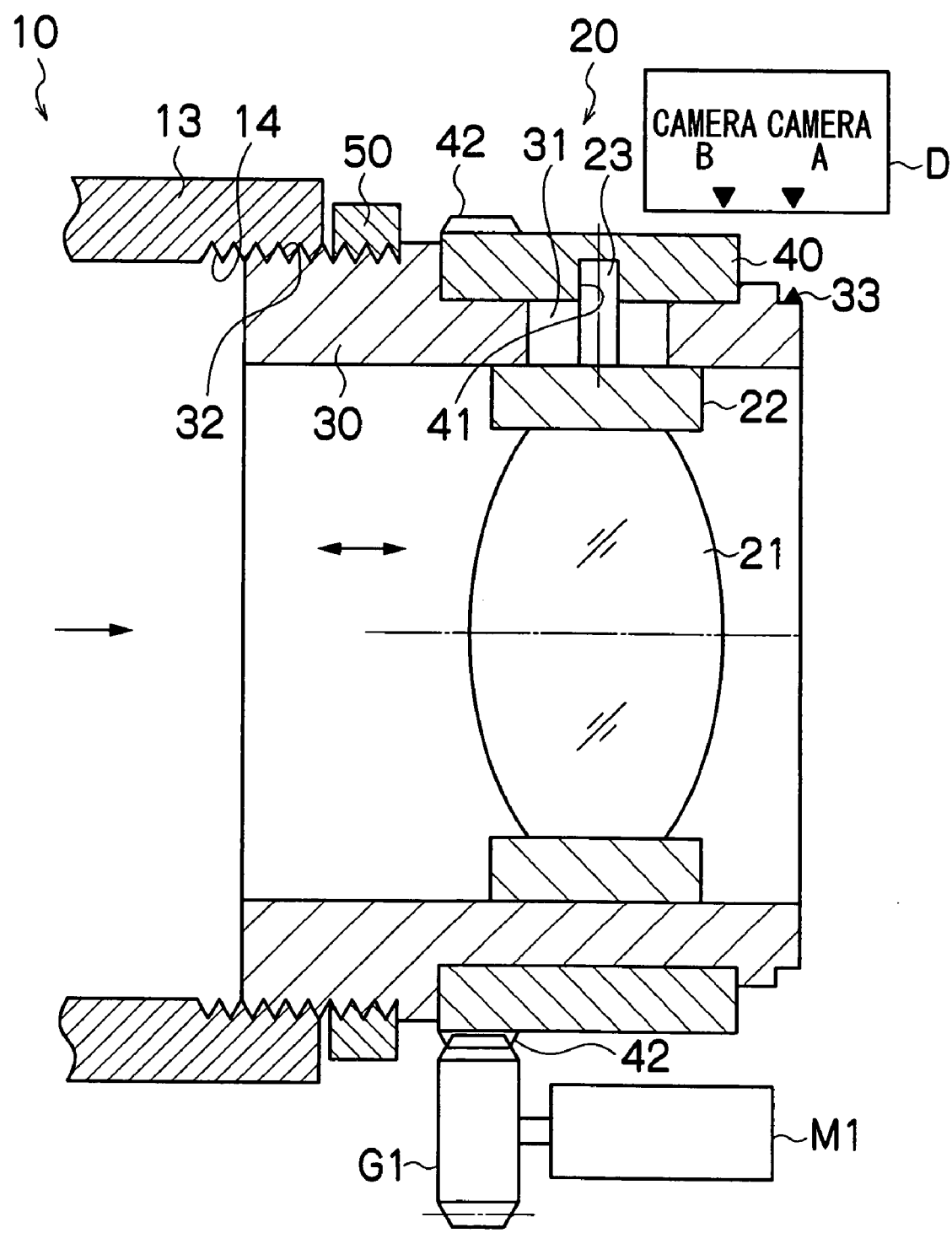
FIG. 2 is an enlarged sectional view of a bayonet mount of the lens barrel according to the first embodiment.

FIG. 1 is a side view for explaining the connection relationship between a lens barrel 10 and a lens supporter S according to the first embodiment. FIG. 2 is an enlarged sectional view of a bayonet mount 12 of the lens barrel 10 shown in FIG. 1. For convenience of explanation, FIG. 2 only shows the main configuration.

As shown in FIG. 1, the lens barrel 10 is a lens barrel for a television camera (so-called box type lens) for commercial use, broadcast stations, and so on. The lens barrel 10 includes both of a hanging mount 11 for mounting a large camera (not shown) or the lens supporter S and the bayonet mount 12.

As shown in FIG. 2, in the lens device of the present embodiment, a flange-back adjusting unit 20 is screwed into an end 13 of the lens barrel 10. The flange-back adjusting unit 20 can be moved forward and backward in an optical axis direction by adjusting the amount of screwing. After the forward/backward movement, the flange-back adjusting unit 20 is fixed on a predetermined position by a pressing ring 50 for fixation. This configuration will be specifically described below.

The flange-back adjusting unit 20 includes a master lens 21 (generally includes a number of lenses and thus may be referred to as master lenses). The side of the master lens 21 is held by a lens frame 22 substantially shaped like a cylinder. A cam pin 23 (corresponding to an engaging portion of the present invention) is provided on the outer surface of the lens frame 22 and inserted in a vertical groove (long through hole) 31 formed on a support ring 30 substantially shaped like a cylinder. The end of the cam pin 23 protrudes from the outer surface of the support ring 30 by a predetermined amount, and is engaged into a cam groove 41 (extending in the circumferential direction) formed on the inner surface of a cylindrical cam 40 rotatably mounted on the outer surface of the support ring 30.

The lens frame 22 is concentrically inserted into the support ring 30 and the internal diameter of the support ring 30 is set somewhat larger than the outside diameter of the lens frame 22. Therefore, when the cylindrical cam 40 rotates (with respect to the support ring 30), the cam pin 23 relatively moves along the cam groove 41. Accordingly, the lens frame 22 (that is, the master lens 21) is guided on the inner surfaces of the vertical groove 31 and the support ring 30 and is moved forward/backward in the optical axis direction. In order to smoothly rotate the cylindrical cam 40, it is preferable to form at least one of the cylindrical cam 40 and the support ring 30 by using a material such as polyacetal and Teflon (registered trademark) which have high smoothness.

On the outer surface of the cylindrical cam 40, a gear 42 is formed in the circumferential direction. A gear G1 provided on the rotating shaft of a motor M1 is engaged with the gear 42. The motor M1 is fixed to the support ring 30 and the like. In other words, the rotation of the cylindrical cam 40 is controlled by driving force transmitted from the motor M1 (corresponding to a driving mechanism of the present invention). Further, a gear (not shown) provided on the rotating shaft of a potentiometer P is engaged with the gear 42, so that an amount of rotation of the cylindrical cam 40 can be detected.

A thread groove 32 is formed on the outer surface of the support ring 30. The thread groove 32 is screwed into the lens barrel 10 in which a thread groove 14 is formed on the inner surface of the end 13. In other words, the flange-back adjusting unit 20 is moved forward/backward in the optical axis direction by adjusting an amount of screwing of the support ring 30 relative to the lens barrel 10. Further, the pressing ring 50 for fixation is screwed onto the thread groove 32 on the outer surface of the support ring 30. In other words, by tightly fitting the pressing ring 50 for fixation, the flange-back adjusting unit 20 is fixed on the predetermined position after the forward/backward movement.

The desired position of the flange-back adjusting unit 20 varies among television cameras mounted on the lens supporter S. Thus a display member D may be provided to display a desired position of the flange-back adjusting unit 20 for each television camera mounted on the lens supporter S. For example, the display member D may be provided on the end 13 of the lens barrel 10. In this configuration, the flange-back adjusting unit 20 may be moved forward/backward according to the display (for example, an index 33 may be provided on the support ring 30 and matched with the display of the display member D), considerably facilitating a flange-back adjustment for each television camera.

As described above, in the lens device of the present embodiment, the flange-back adjusting unit 20 is moved forward/backward in the optical axis direction by adjusting the amount of screwing of the support ring 30 relative to the lens barrel 10, and the flange-back adjusting unit 20 can be fixed on the predetermined position after the forward/backward movement by tightly fitting the pressing ring 50 for fixation. Thus even when a satisfactory flange-back adjustment cannot be made only by moving the master lens 21 forward/backward by the rotation or the like of the cylindrical cam 40, it is possible to make a proper flange-back adjustment all the time.

Next, a lens barrel according to the second embodiment of a lens device of the present invention will now be described below in accordance with the accompanying drawings.

Figure 3:
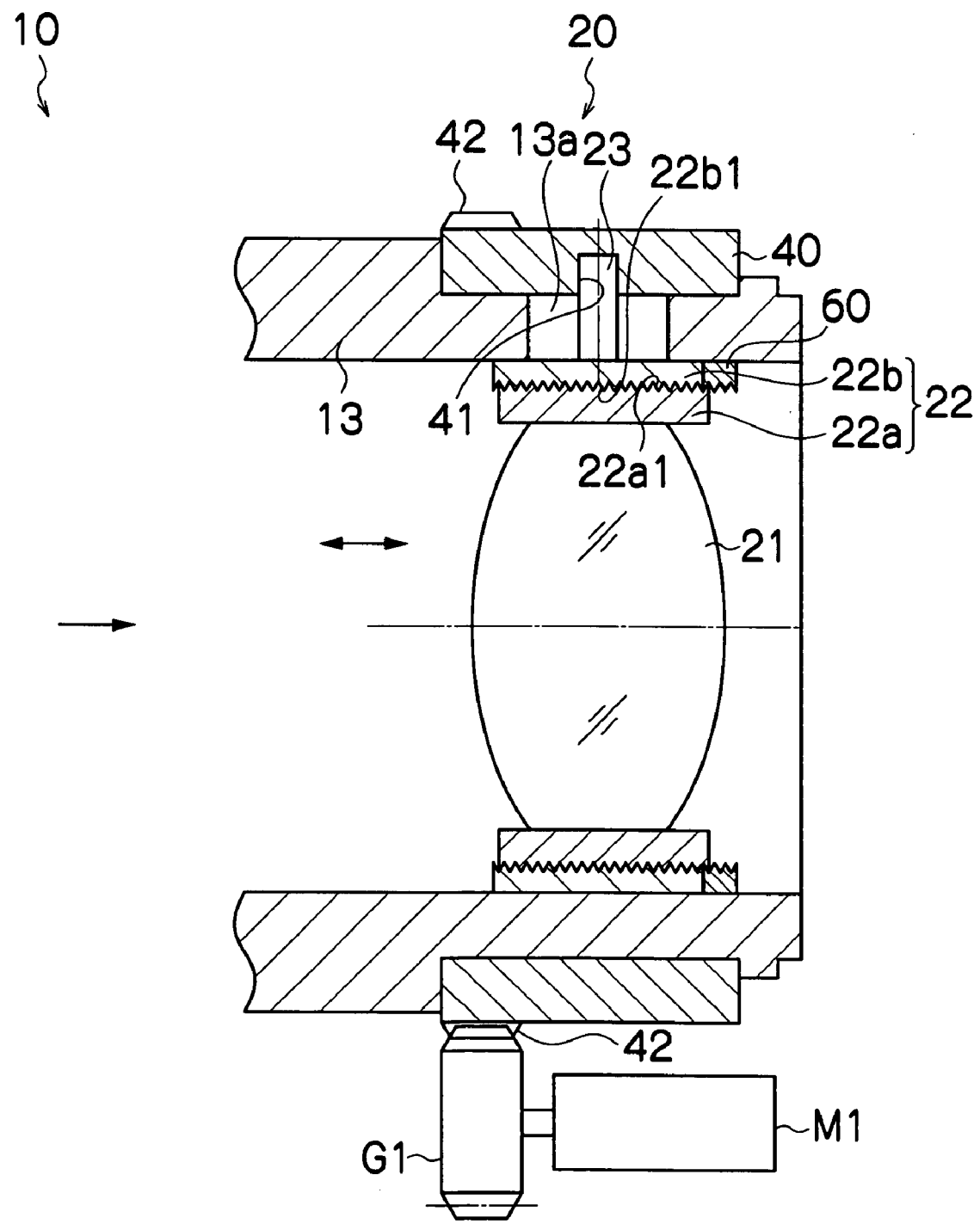
FIG. 3 is an enlarged sectional view of a bayonet mount of a lens barrel according to the second embodiment.

FIG. 3 is a sectional view of a lens barrel 10 according to the second embodiment.

As shown in FIG. 3, in the lens device of the present embodiment, an inner lens frame 22a is screwed into an outer lens frame 22b. The inner lens frame 22a can be moved forward and backward in an optical axis direction by adjusting the amount of screwing. After the forward/backward movement, the inner lens frame 22a is fixed on a predetermined position by a pressing ring 60 for fixation. These points are the main characteristics of the lens device of the present embodiment and are different from those of the first embodiment. The configuration thereof will be specifically described below. The same configurations as those of the first embodiment are designated as the same reference numerals.

A master lens 21 and the like are provided on an end 13 of the lens barrel 10. The side of the master lens 21 is held by the inner lens frame 22a substantially shaped like a cylinder. A thread groove 22a1 is formed on the outer surface of the inner lens frame 22a. The thread groove 22a1 is screwed into the outer lens frame 22b including a thread groove 22b1 formed on the inner surface of the outer lens frame 22b. In other words, the inner lens frame 22a is moved forward and backward in the optical axis direction by adjusting an amount of screwing of the inner lens frame 22a relative to the outer lens frame 22b. Further, the pressing ring 60 for fixation is screwed onto the thread groove 22a1 on the outer surface of the inner lens frame 22a. In other words, by tightly fitting the pressing ring 60 for fixation, the inner lens frame 22a (that is, the master lens 21) is fixed on the predetermined position after the forward/backward movement.

The desired position of the inner lens frame 22a varies among television cameras mounted on a lens supporter S. Thus a display member (not shown) similar to a display member D may be provided to display a desired position of the inner lens frame 22a for each television camera mounted on the lens supporter S. For example, the display member may be provided on the end 13 of the lens barrel 10. In this configuration, the inner lens frame 22a may be moved forward/backward according to the display (for example, an index (not shown) may be provided on the inner lens frame 22a and matched with the display of the display member), considerably facilitating a flange-back adjustment for each television camera.

A cam pin 23 (corresponding to an engaging portion of the present invention) is provided on the outer surface of the outer lens frame 22b and inserted in a vertical groove (long through hole) 13a formed on the end 13 of the lens barrel 10 substantially shaped like a cylinder. The end of the cam pin 23 protrudes from the outer surface of the end 13 of the lens barrel 10 by a predetermined amount and is engaged into a cam groove 41 (extending in the circumferential direction)

formed on the inner surface of a cylindrical cam 40 rotatably mounted on the outer surface of the end 13 of the lens barrel 10.

The outer lens frame 22b is concentrically inserted into the end 13 of the lens barrel 10 and the internal diameter of the end 13 of the lens barrel 10 is set somewhat larger than the outside diameter of the outer lens frame 22b. Therefore, when the cylindrical cam 40 rotates (with respect to the end 13 of the lens barrel 10), the cam pin 23 relatively moves along the cam groove 41. Accordingly, the lens frame 22 (that is, the master lens 21) is guided on the inner surfaces of the vertical groove 13a and the end 13 of the lens barrel 10 and is moved forward/backward in the optical axis direction. In order to smoothly rotate the cylindrical cam 40, it is preferable to form at least one of the cylindrical cam 40 and the end 13 by using a material such as polyacetal and Teflon (registered trademark) which have high smoothness.

On the outer surface of the cylindrical cam 40, a gear 42 is formed in the circumferential direction. A gear G1 provided on the rotating shaft of a motor M1 is engaged with the gear 42. The motor M1 is fixed to a support ring 30 and the like. In other words, the rotation of the cylindrical cam 40 is controlled by driving force transmitted from the motor M1 (corresponding to a driving mechanism of the present invention). Further, a gear (not shown) provided on the rotating shaft of a potentiometer P is engaged with the gear 42, so that an amount of rotation of the cylindrical cam 40 can be detected.

As described above, in the lens device of the present embodiment, the inner lens frame 22a is moved forward/backward in the optical axis direction by adjusting the amount of screwing of the inner lens frame 22a relative to the outer lens frame 22b, and the inner lens frame 22a (that is, the master lens 21) can be fixed on the predetermined position after the forward/backward movement by tightly fitting the pressing ring 60 for fixation. Thus even when a satisfactory flange-back adjustment cannot be made only by moving the outer lens frame 22b (that is, the master lens 21) forward/backward by the rotation or the like of the cylindrical cam 40, it is possible to make a proper flange-back adjustment all the time.

As compared with the conventional flange-back adjusting mechanism, the lens barrel 10 of the present embodiment achieves an effect as will be described below. In the conventional flange-back adjusting mechanism, for example, a "displacement" caused by mounting a television camera slightly away from the flange surface of a bayonet mount can be corrected by extending, by a predetermined amount, a cam groove formed in a cylindrical cam corresponding to the cylindrical cam 40. However, as the cam groove is extended, the overall length of the lens barrel is increased accordingly, so that the lens barrel cannot be miniaturized.

In the lens barrel 10 of the present embodiment, an amount of screwing of the inner lens frame 22a is adjusted relative to the outer lens frame 22b, so that the overall length of the lens barrel is not increased.

Next, a lens barrel according to the third embodiment of a lens device of the present invention will now be described below in accordance with the accompanying drawings.

Figure 4:
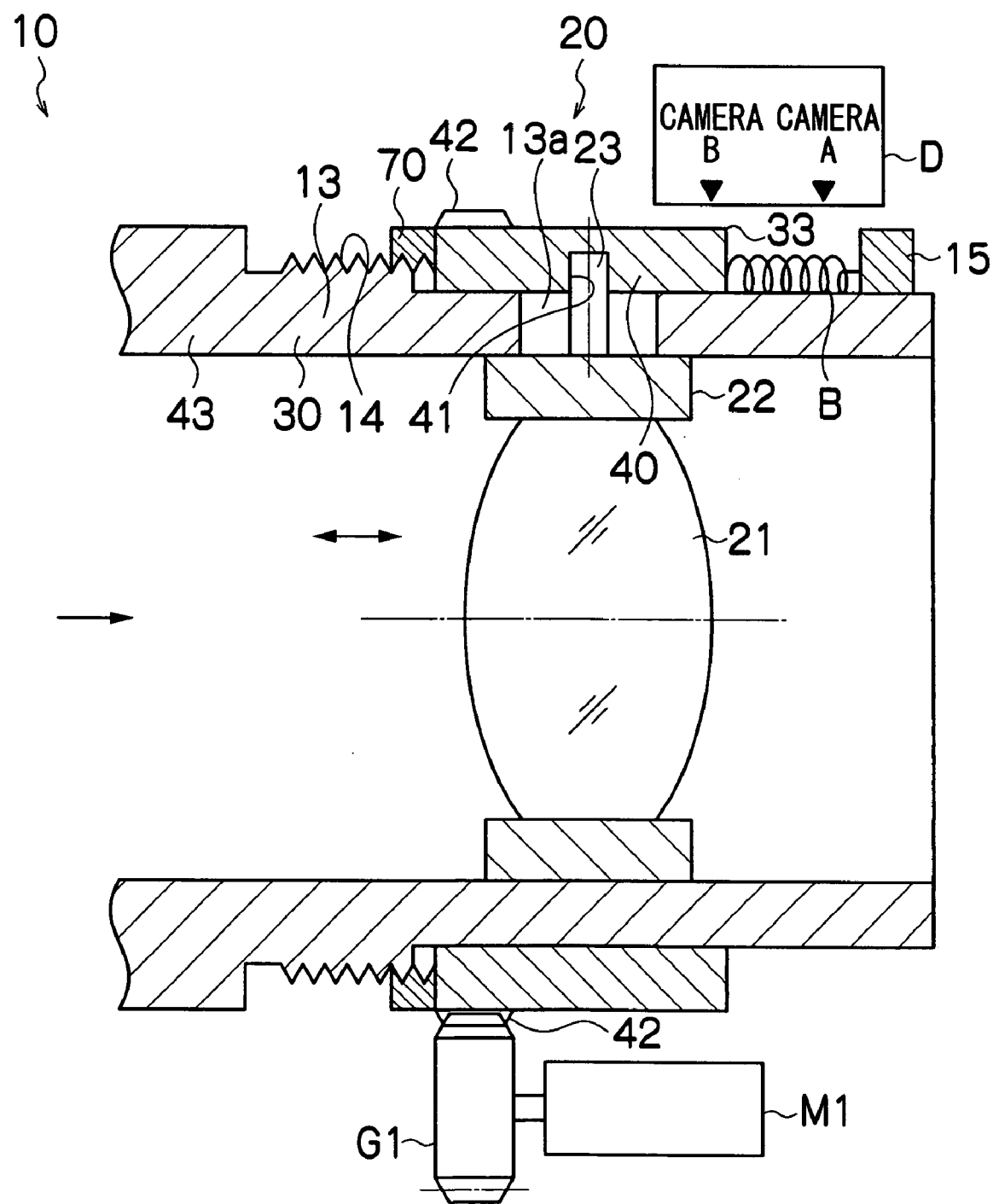
FIG. 4 is an enlarged sectional view of a bayonet mount of a lens barrel according to the third embodiment.

FIG. 4 is a sectional view of a lens barrel 10 according to the third embodiment.

As shown in FIG. 4, in the lens device of the present embodiment, a cylindrical cam 40 is disposed between an elastic member B and a positioning ring 70. The elastic member B has one end fixed on the lens barrel 10 and the other end making contact with a side of the cylindrical cam 40. The positioning ring 70 has one side making contact with the opposite side of the cylindrical cam 40 from the side making contact with the elastic member B. When the positioning ring 70 is rotated to change the screwing position, the cylindrical cam 40 moves forward/backward to cause the elastic member B to extend or contract, and the cylindrical cam 40 is fixed on a predetermined position after the forward/backward movement. This configuration will be specifically described below. The same configurations as those of the first embodiment are designated as the same reference numerals.

A master lens 21 and the like are provided on an end 13 of the lens barrel 10. The side of the master lens 21 is held by a lens frame 22 substantially shaped like a cylinder. A cam pin 23 (corresponding to an engaging portion of the present invention) is provided on the outer surface of the lens frame 22 and inserted in a vertical groove (long through hole) 13a formed on the end 13 of the lens barrel 10 substantially shaped like a cylinder. The end of the cam pin 23 protrudes from the outer surface of the end 13 of the lens barrel 10 by a predetermined amount, and is engaged into a cam groove 41 (extending in the circumferential direction) formed on the inner surface of the cylindrical cam 40 rotatably mounted on the outer surface of the end 13 of the lens barrel 10.

The lens frame 22 is concentrically inserted into the end 13 of the lens barrel 10 and the internal diameter of the end 13 of the lens barrel 10 is set somewhat larger than the outside diameter of the lens frame 22. Therefore, when the cylindrical cam 40 rotates (with respect to the end 13 of the lens barrel 10), the cam pin 23 relatively moves along the cam groove 41. Accordingly, the lens frame 22 (that is, the master lens 21) is guided on the inner surfaces of the vertical groove 13a and the end 13 of the lens barrel 10 and is moved forward/backward in an optical axis direction. In order to smoothly rotate the cylindrical cam 40, it is preferable to form at least one of the cylindrical cam 40 and the end 13 by using a material such as polyacetal and Teflon (registered trademark) which have high smoothness.

A thread groove 14 is formed on the outer surface of the end 13 of the lens barrel 10, and the positioning ring 70 is screwed onto the thread groove 14. Further, a protrusion 15 is provided on the outer surface of the end 13 of the lens barrel 10. The cylindrical cam 40 is disposed between the positioning ring 70 and the protrusion 15. One end of the elastic member B is fixed on the protrusion 15 and the other end of the elastic member B is in contact with the side of the cylindrical cam 40. The positioning ring 70 has one side making contact with the opposite side of the cylindrical cam 40 from the side making contact with the elastic member B. In other words, when the positioning ring 70 is rotated to change the screwing position, the cylindrical cam 40 moves forward/backward to cause the elastic member B to extend or contract and the cylindrical cam 40 is fixed on the predetermined position after the forward/backward movement.

The desired position of the cylindrical cam 40 varies among television cameras mounted on a lens supporter S. Thus a display member D may be provided to display a desired position of the cylindrical cam 40 for each television camera mounted on the lens supporter S. For example, the display member D may be provided on the end 13 of the lens barrel 10. In this configuration, the cylindrical cam 40 may be moved forward/backward according to the display (for example, one end face of the cylindrical cam 40 may be matched with the display of the display member D), considerably facilitating a flange-back adjustment for each television camera.

On the outer surface of the cylindrical cam 40, a gear 42 is formed in the circumferential direction. A gear G1 provided on the rotating shaft of a motor M1 is engaged with the gear 42. The motor M1 is fixed to a support ring 30 and the like. In other words, the rotation of the cylindrical cam 40 is controlled by driving force transmitted from the motor M1 (corresponding to a driving mechanism of the present invention). Further, a gear (not shown) provided on the rotating shaft of a potentiometer P is engaged with the gear 42, so that an amount of rotation of the cylindrical cam 40 can be detected.

As described above, in the lens device of the present embodiment, the cylindrical cam 40 can be moved forward/backward by rotating the positioning ring 70 and fixed on the predetermined position after the forward/backward movement. Thus even when a satisfactory flange-back adjustment cannot be made only by moving the lens frame 22 (that is, the master lens 21) forward/backward by the rotation or the like of the cylindrical cam 40, it is possible to make a proper flange-back adjustment all the time.

In the lens device of the present embodiment, the cylindrical cam 40 can be moved forward/backward by rotating the positioning ring 70 and fixed on the predetermined position after the forward/backward movement. However, the present invention is not limited to this configuration.

Figure 5:
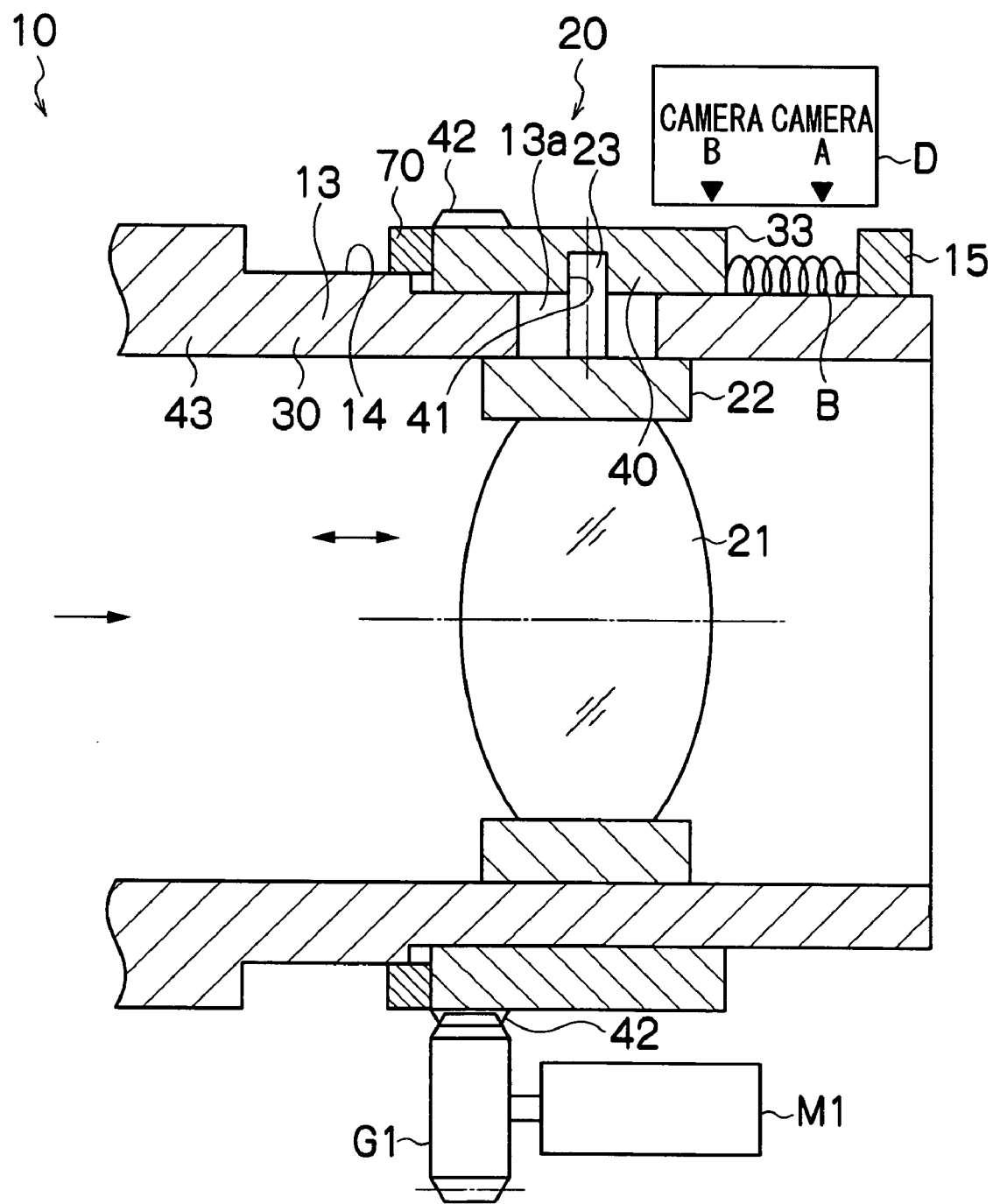
FIG. 5 is an enlarged sectional view of a bayonet mount of a lens barrel according to the third embodiment (variation)

For example, as shown in FIG. 5, a fixing mechanism (stopper) may be provided in which a positioning ring 70 is slidably mounted on the outer surface of an end 13 of a lens barrel 10 in the optical axis direction (in other words, a thread groove 14 is not provided) and the positioning ring 70 is engaged with the lens barrel 10 and fixed thereon every time the positioning ring 70 is slid.

Such a fixing mechanism may vary in configuration. For example, the positioning ring 70 may include a hook (not shown) and the lens barrel 10 may include, for engagement with the hook, an engaging portion for a television camera A and an engaging portion for a television camera B. With this configuration, every time the positioning ring 70 is slid, the positioning ring 70 (in this case, the hook) is engaged with and fixed on the lens barrel 10 (in this case, one of the engaging portion for the television camera A and the engaging portion for the television camera B). In this case, a control lever (corresponding to an operating member of the present invention) protruding from the inside to the outside of the lens barrel 10 may be provided to easily slide the positioning ring 70 from the outside of the lens barrel 10, and the positioning ring 70 may be slid to one of the engaging portion for the television camera A and the engaging portion for the television camera B by switching the lever. Further, a predetermined clicking mechanism may be provided to allow a user to feel a click upon engagement.

Figure 6:
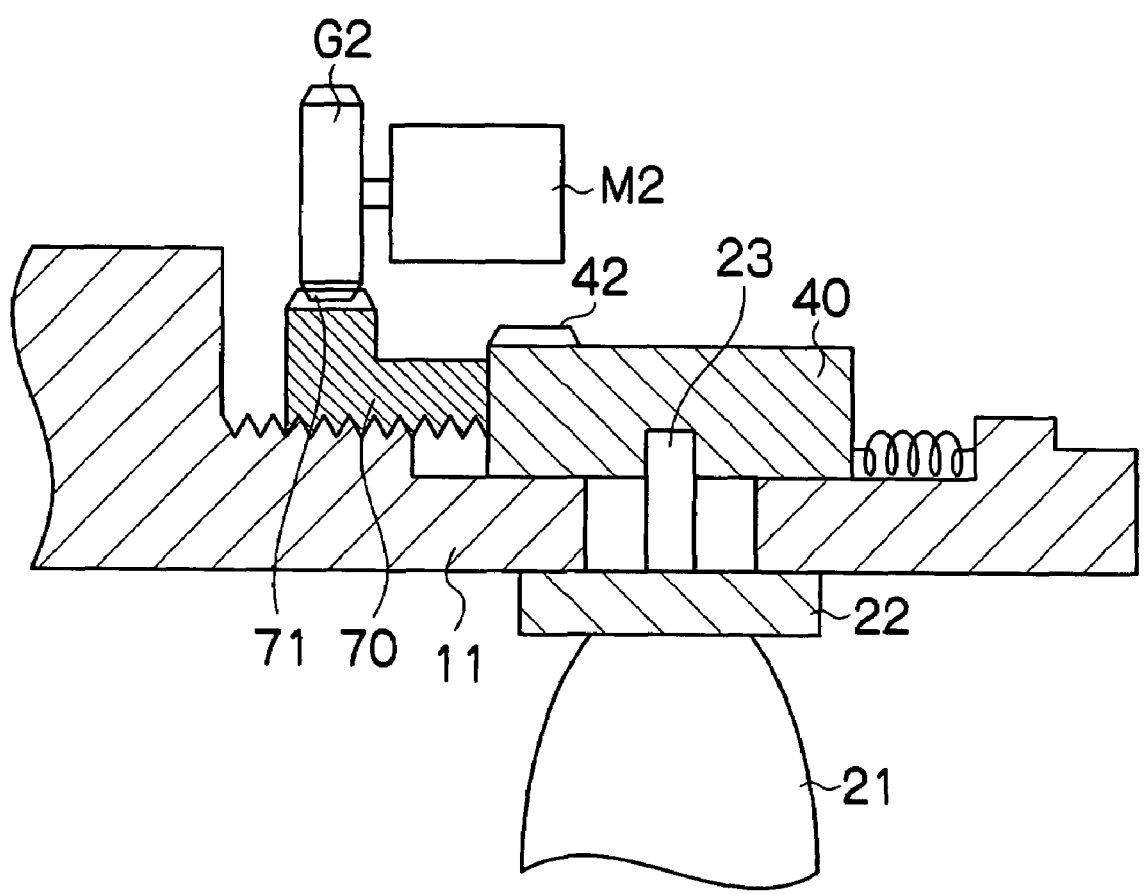
FIG. 6 is an enlarged sectional view of a bayonet mount of a lens barrel according to the third embodiment (variation)

Moreover, as shown in FIG. 6, a gear 71 may be formed on the outer surface of a positioning ring 70, and one of a gear G2 provided on the rotating shaft of a motor M2 and a gear G3 provided on the rotating shaft of a potentiometer P may be engaged with the gear 71.

Figure 7:
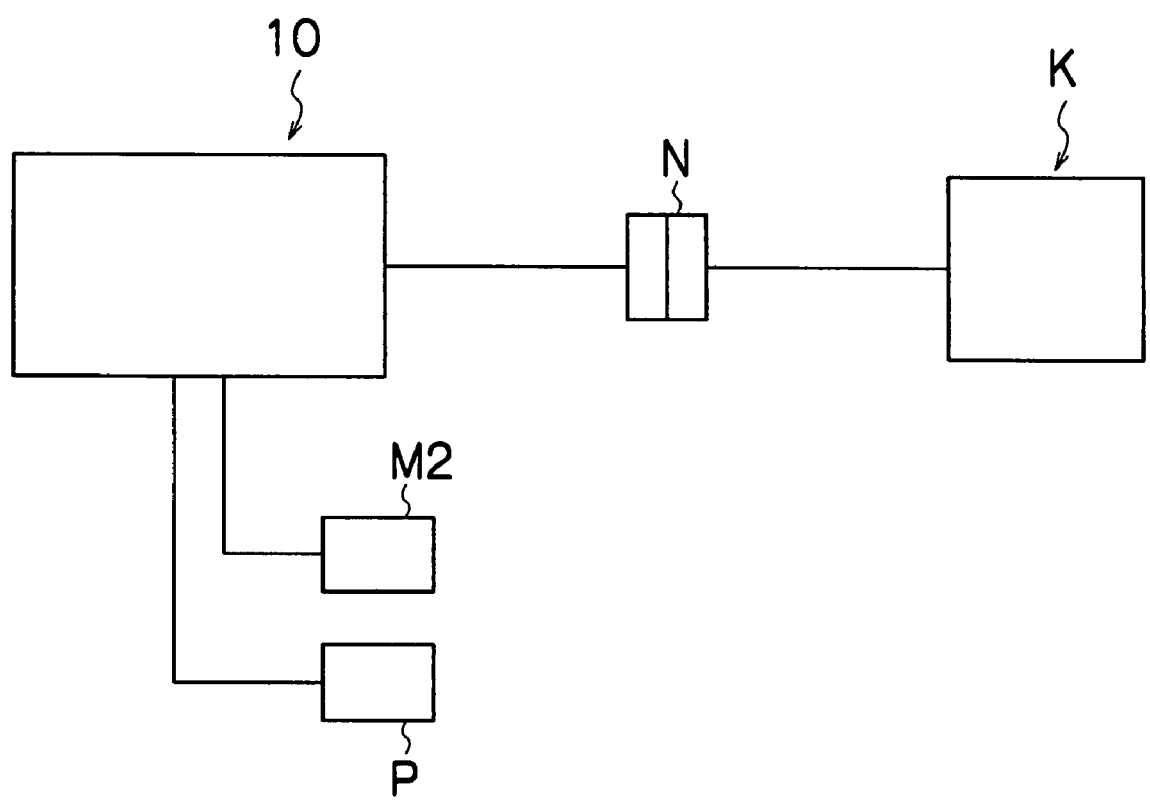
FIG. 7 is a structural diagram for explaining a state in which the lens barrel of the third embodiment and a television camera are connected to each other via a connector.

With this configuration, for example, in a television camera system where a lens barrel 10 and a television camera K are connected to each other via a connector N as shown in FIG. 7, a cylindrical cam 40 (that is, a master lens 21) can be automatically moved forward/backward in response to a signal from the television camera K (for example, a signal corresponding to the mounting position of the television camera K and the kind of the television camera K) and the cylindrical cam 40 can be fixed on a predetermined position after the forward/backward movement.

When it is detected that the flange back is insufficient in the television camera K, the cylindrical cam 40 (that is, the master lens 21) is automatically moved forward/backward and fixed on the predetermined position after the forward/backward movement, so that a flange-back adjustment can be made.

The foregoing embodiments are just examples in every aspect and the present invention is not limited by the above descriptions. The present invention can be implemented in other various forms without departing from the spirit or main features of the invention.

What is claimed is:

1. A lens device provided on a lens barrel for a television camera, the lens device comprising:
    a master lens;
    a flange-back adjusting mechanism for moving the master lens forward/backward in an optical axis direction;
    a flange-back adjusting unit including the master lens and the flange-back adjusting mechanism, the flange-back adjusting unit being movable forward/backward in the optical axis direction; and
    a fixing member for fixing the flange-back adjusting unit on a predetermined position after the forward/backward movement,
    wherein the flange-back adjusting mechanism includes:
    a cylindrical cam having an inner surface on which a cam groove is formed, the cylindrical cam being rotated by driving force transmitted from a driving mechanism;
    a support ring rotatably supporting the cylindrical cam; and
    a lens frame having an engaging portion engaged with the cam groove, the lens frame holding the master lens being moved forward/backward in the optical axis direction by relatively moving the engaging portion along the cam groove by the rotation of the cylindrical cam.

2. The lens device according claim 1, wherein
    the support ring is screwed into an end of the lens barrel, and
    the flange-back adjusting unit is moved forward/backward in the optical axis direction by adjusting an amount of screwing of the support ring relative to the lens barrel.

3. The lens device according to claim 2, wherein
    the fixing member is a pressing ring for fixture, the pressing ring being screwed onto the support ring.

4. The lens device according to claim 3, further comprising:
    a mounting portion on which a lens supporter for mounting a television camera is mounted; and
    a display member for displaying a desired position of the flange-back adjusting unit for each camera mounted on the lens supporter for mounting a television camera.

5. The lens device according to claim 2, further comprising:
    a mounting portion on which a lens supporter for mounting a television camera is mounted; and
    a display member for displaying a desired position of the flange-back adjusting unit for each camera mounted on the lens supporter for mounting a television camera.

6. The lens device according to claim 1, further comprising:
    a mounting portion on which a lens supporter for mounting a television camera is mounted; and
    a display member for displaying a desired position of the flange-back adjusting unit for each camera mounted on the lens supporter for mounting a television camera.

7. The lens device according to claim 1, further comprising:
    a mounting portion on which a lens supporter for mounting a television camera is mounted; and
    a display member for displaying a desired position of the flange-back adjusting unit for each camera mounted on the lens supporter for mounting a television camera.

8. A lens device provided on a lens barrel for a television camera, the lens device comprising:

a master lens;

an outer lens frame;

an inner lens frame for holding the master lens, the inner lens frame being movable forward/backward on the outer lens frame;

a flange-back adjusting mechanism for moving the outer lens frame forward/backward in the optical axis direction; and a fixing member for fixing the inner lens frame on a predetermined position after the forward/backward movement, wherein the flange-back adjusting mechanism includes:

a cylindrical cam having an inner surface on which a cam groove is formed, the cylindrical cam being rotated by driving force transmitted from a driving mechanism;

a support ring rotatably supporting the cylindrical cam; and a lens frame having an engaging portion engaged with the cam groove, the lens frame holding the master lens being moved forward/backward in the optical axis direction by relatively moving the engaging portion along the cam groove by the rotation of the cylindrical cam.

9. The lens device according to claim 8, wherein the inner lens frame is screwed into the outer lens frame, and the inner lens frame is moved forward/backward in the optical axis direction by adjusting an amount of screwing of the inner lens frame relative to the outer lens frame.

10. The lens device according to claim 9, wherein the fixing member is a pressing ring for fixture, the pressing ring being screwed onto the inner lens frame.

11. The lens device according to claim 10, further comprising:

a mounting portion on which a lens supporter for mounting a television camera is mounted; and a display member for displaying a desired position of the inner lens frame for each camera mounted on the lens supporter for mounting a television camera.

12. The lens device according to claim 9, further comprising:

a mounting portion on which a lens supporter for mounting a television camera is mounted; and a display member for displaying a desired position of the inner lens frame for each camera mounted on the lens supporter for mounting a television camera.

13. The lens device according to claim 8, further comprising:

a mounting portion on which a lens supporter for mounting a television camera is mounted; and a display member for displaying a desired position of the inner lens frame for each camera mounted on the lens supporter for mounting a television camera.

14. A lens device provided on a lens barrel for a television camera, the lens device comprising:

a cylindrical cam having an inner surface on which a cam groove is formed, the cylindrical cam being rotated by driving force transmitted from a driving mechanism;

a master lens having an engaging portion engaged with the cam groove, the master lens being moved forward/backward in an optical axis direction by relatively moving the engaging portion along the cam groove by the rotation of the cylindrical cam; and a position adjusting mechanism for moving the cylindrical cam forward/backward and fixing the cylindrical cam on a predetermined position after the forward/backward movement.

15. The lens device according to claim 14, wherein the positioning mechanism includes an elastic member and a positioning ring screwed onto the lens barrel, the cylindrical cam is disposed between the elastic member and the positioning ring, the elastic member has one end fixed on the lens barrel and the other end making contact with a side of the cylindrical cam, the positioning ring has one side making contact with an opposite side of the cylindrical cam from the side making contact with the elastic member, and when the positioning ring is rotated to change a screwing position, the cylindrical cam is moved forward/backward to cause the elastic member to extend or contract and the position of the cylindrical cam is fixed after the forward/backward movement.

16. The lens device according to claim 14, wherein the positioning mechanism includes an operating member for moving the cylindrical cam forward/backward from an outside of the lens barrel.

17. The lens device according to claim 14, further comprising:

a mounting portion on which a lens supporter for mounting a television camera is mounted; and a display member for displaying a desired position of the cylindrical cam for each camera mounted on the lens supporter for mounting a television camera.

* * * * *